United States Patent [19]
Shintani et al.

[11] Patent Number: 5,614,110
[45] Date of Patent: Mar. 25, 1997

[54] VARYING PROTECTIVE GAS COMPOSITION BETWEEN PIERCING AND CUTTING WITH PLASMA TORCH

[75] Inventors: Toshiya Shintani, Chigasaki; Masahiko Hasegawa, Hiratsuka, both of Japan

[73] Assignee: Komatsu Ltd., Tokyo, Japan

[21] Appl. No.: 495,513

[22] PCT Filed: Jan. 25, 1994

[86] PCT No.: PCT/JP94/00091

§ 371 Date: Jul. 28, 1995

§ 102(e) Date: Jul. 28, 1995

[87] PCT Pub. No.: WO94/16857

PCT Pub. Date: Aug. 4, 1994

[30] Foreign Application Priority Data

Jan. 29, 1993 [JP] Japan .................................. 5-034423

[51] Int. Cl.$^6$ ...................................................... B23K 10/00
[52] U.S. Cl. ................................. 219/121.44; 219/121.39; 219/121.55; 219/121.59
[58] Field of Search ......................... 219/121.39, 121.44, 219/121.59, 121.51, 121.55, 121.54, 74, 75, 121.48

[56] References Cited

U.S. PATENT DOCUMENTS

| | | | |
|---|---|---|---|
| 4,861,962 | 8/1989 | Sanders et al. | 219/121.5 |
| 5,225,658 | 7/1993 | Yamaguchi et al. | 219/121.57 |
| 5,290,995 | 3/1994 | Higgins et al. | 219/121.44 |
| 5,396,043 | 3/1995 | Couch, Jr. et al. | 219/121.5 |
| 5,414,237 | 5/1995 | Carkhuff | 219/121.51 |
| 5,424,507 | 6/1995 | Yamaguchi | 219/121.44 |

FOREIGN PATENT DOCUMENTS

| | | |
|---|---|---|
| 51-16379 | 5/1976 | Japan . |
| 51-98652 | 8/1976 | Japan . |
| 59-229282 | 12/1984 | Japan . |
| 61-92782 | 5/1986 | Japan . |
| 61-289991 | 12/1986 | Japan . |
| 1-172464 | 12/1989 | Japan . |
| 2-92481 | 4/1990 | Japan . |
| 3-193273 | 8/1991 | Japan . |
| 5-84579 | 4/1993 | Japan . |

*Primary Examiner*—Mark H. Paschall
*Attorney, Agent, or Firm*—Sidley & Austin

[57] ABSTRACT

The present invention comprises a plasma cutting method and a cutting apparatus in which switching can be effected between suitable flow rates of a protective gas at the time of piercing and at the time of cutting, and in which suitable compositions of the protective gas can be set with respect to the time of piercing and the time of cutting, so that it is possible to protect a nozzle favorably from dross and the like, to provide a cut surface high quality and to reduce the operating cost of the protective gas. To achieve this, there are provided a piercing completion detection unit (27, 40) which detects an electric current between an electrode (1) and a workpiece (31) at the time of piercing, and which outputs a signal at the time of the completion of the piercing, and a flow regulator (15) which is provided in a protective gas circuit and which switches, in response to the piercing completion signal, the flow rate of the protective gas from a flow rate at the time of piercing to a flow rate at the time of cutting. Further, on-off valves (51, 53) can be provided in the protective gas circuit to effect switching between the composition of the protective gas at the time of piercing and the composition at the time of cutting.

15 Claims, 3 Drawing Sheets

VARYING PROTECTIVE GAS COMPOSITION BETWEEN PIERCING AND CUTTING WITH PLASMA TORCH

TECHNICAL FIELD

The present invention relates to a plasma cutting method and a cutting apparatus and, more particularly, to a plasma cutting method and a cutting apparatus used for cutting a workpiece.

BACKGROUND ART

Conventionally, a plasma cutting apparatus having an electrode, a nozzle disposed as a cover with a spacing for a plasma gas passage, and an electrically insulated protective cap, having an opening facing a nozzle orifice on the outside and at the extreme end of the nozzle, is employed to cut a workpiece while causing a protective gas to flow from the opening of the protective gap to protect the nozzle.

such conventional art will be described with reference to FIG. 5. An electrode 61 is provided at a center of a torch 60, and a nozzle 65 is disposed outside the electrode 61 as a cover with a spacing for a plasma gas passage 63. A high-temperature plasma gas flow 72, formed by causing a plasma gas flow and by simultaneously generating a plasma arc between the electrode 61 and a workpiece 71, is made thinner by the orifice 65a of the nozzle 65 and is jetted to the workpiece 71, thus performing cutting. In this cutting, the shape of the orifice 65a of the nozzle 65, for making the plasma gas flow 72 thinner, largely affects cutting qualities (an inclination of a cut surface, roughness of the cut surface, attachment of dross which is a molten metal, and the like). That is, during the operation of forming a hole in order to be able to start a cutting operation (referred to hereinafter as the time of piercing), if dross 73, blown upwardly from the workpiece 71, attaches to the nozzle 65 or if the nozzle 65 and the workpiece 71 contact each other due to thermal strain or the like during cutting, the orifice 65a is deformed, so that the cut quality is considerably reduced. This is a serious problem in terms of practical use. To cope with this problem, a protective cap 69, having an opening facing the orifice 65 of the nozzle 65, is provided as shown in FIG. 5. This protective cap 69 is electrically insulated from the electrode 61 and the nozzle 65 to prevent irregular discharge (double arc). Also, a protective gas is caused to flow from the cap opening from the start of a cutting to the completion of the cutting, to protect the nozzle 65 against dross 73 blown upwardly from the workpiece 71 (refer to, for example, Japanese Patent Application No. 4-72109).

In this operation of protecting the nozzle with the protective cap, a large amount of protective gas is caused to flow at the time of piercing as well as at the time of cutting. The following two problems are therefore encountered. First, because the flow velocity and the flow rate of the protective gas are large, the high-temperature plasma gas flow downstream of the nozzle is so cooled that the cutting ability is reduced and the amount of attachment of dross is increased, thereby affecting the cut quality. If only a small misalignment occurs between the axes of the orifice of the nozzle and the opening of the protective cap, it also has a bad influence; that is, the plasma gas flow is inclined and disturbed by the strong protective gas flow. Therefore, a special mounting device or a longer mounting time is required in order to achieve a high accuracy of mounting the protective cap.

The second problem is that the operating cost is high because the amount of protective gas used is large. The operating cost is allowable when a low-priced gas such as air is used as the protective gas, but it becomes high when a high-priced gas is used. As a method for externally shielding a plasma gas flow for the purpose of improving cut qualities, the following and other methods are known: a method of shielding an oxygen plasma with oxygen (see, for example, Japanese Patent Laid-Open No. 59-229282); a method of shielding a plasma gas flow with an inert gas to prevent the plasma gas flow from involving atmospheric air (see, for example, Japanese Patent Laid-Open No. 51-98652); and a method of shielding an oxygen plasma with hydrogen gas to cut stainless steel with an effect of achieving a high quality with metallic gloss and without oxidizing the stainless steel (see, for example, Japanese Patent Application No. 01-333548). The protective gas, for protecting the nozzle, is caused to flow so as to surround the plasma gas flow, whereby it can also serve as a shielding gas. However, in a case where expensive argon gas, hydrogen or a mixture of such gases is used to achieve a shielding effect as well as the protection of the nozzle, a problem in terms of operating cost is encountered, because a large amount of gas is consumed for the purpose of the protection of the nozzle while only a small amount of the gas can suffice for separating the plasma gas from the atmospheric air for the purpose of shielding.

With respect to the problem of the consumption of a large amount of the protective gas, conventional arts described below are known. First, a protective cap has an opening facing a nozzle orifice (an opening through which plasma gas flows) and a multiplicity of holes on the external side. By adopting such an arrangement, the flow rate of the protective gas flowing out from the opening is limited so that the influence upon the plasma gas flow is small even if the protective gas flow rate is high, thus preventing a reduction in cutting ability (see, for example, U.S. Pat. No. 4,861,962). However, this method is intended for use in the case of increasing the protective gas flow rate for the purpose of the protective gas cooling the nozzle exposed to heat at a high temperature. In this method, the protective gas is caused to flow at the time of cutting as well as at the time of piercing. Accordingly, the cooling effect of the protective gas on the plasma gas flow during cutting is not reduced, and a reduction in cut quality cannot be avoided.

As another conventional art, reducing the consumption of the oxygen gas used as a shielding gas, by causing a flow of the shielding gas only at the time of piercing and by shutting off the shielding gas during cutting, is known (see, for example, Japanese Utility Model Application No. 63-68879). However, this method is intended to prevent burning which can occur during cutting, and is different from those utilizing the shielding gas for protecting the nozzle from the dross. According to this method, therefore, the gas is caused to flow at a low rate at the time of piercing. Accordingly, the proportion of the shielding gas cost in the operating cost is small, but no protective gas effect is obtained since the shielding gas is shut off during cutting.

As still another conventional art, selectively using various active and inert gases with an inter-nozzle passage of a plasma cutting torch, having a multi-layer nozzle structure, to protect an electrode used in an inert gas atmosphere from an active gas, is known (see, for example, Japanese Patent Publication No. 51-16379). According to this method, the amount of gas used can be optimized if there are two or more kinds of gas. However, the torch is not provided with a nozzle protecting cap, and a protective gas cannot be used.

The present invention has been accomplished to overcome the above-described shortcomings of the conventional art, and an object of the present invention is to provide a plasma cutting method and a cutting apparatus in which a nozzle is suitably protected from dross, blown upwardly from a workpiece at the time of piercing and at the time of cutting, in which the cooling and disturbing effects of a protective gas on a plasma gas flow at the time of cutting are reduced to enable protection of the nozzle and good cutting, and which make it possible to reduce the operating cost of the protective gas.

SUMMARY OF THE INVENTION

According to one aspect of the present invention, there is provided a plasma cutting method in which the flow rate of a protective gas is changed with respect to a time of piercing, in order to be able to start a cutting, and a time of cutting. Also, there is provided a plasma cutting method in which a protective gas is caused to flow at a high flow rate at the time of a piercing, in order to be able to start a cutting, to blow away dross blown upwardly, and is caused to flow at a low rate at the time of cutting, to blow away dross downwardly from a workpiece.

This arrangement ensures that the nozzle can be protected from dross or the like, and the cooling and disturbing effect of the protective gas on a plasma gas flow can be reduced to enable favorable cutting. That is, at the time of piercing for forming a hole by melting a portion of a workpiece, the dross and the protective gas flow are entirely blown upwardly (toward the torch). The amount of this dross is large, and the dross is scattered in the form of large-diameter particles and has a large momentum. On the other hand, at the time of cutting, the greater portions of the plasma gas flow and the dross flow through the workpiece to the reverse side of the workpiece, and only a small amount of spark-like dross is blown upwardly. Accordingly, the flow rate of the protective gas is changed with respect to the time of piercing and the time of cutting, that is, a high flow rate is set at the time of piercing while a low flow rate is set at the time of cutting, whereby the nozzle can be protected efficiently. At the time of cutting, the high-temperature plasma gas flow jetted from the nozzle is liable to be cooled and disturbed by the protective gas. However, since the flow rate of the protective gas at the time of cutting is reduced, such undesirable influences can be minimized, so that a cut surface having a good quality can be obtained.

According to a second aspect of the present invention, there is provided a plasma cutting method in which the composition of a protective gas is changed with respect to a time of piercing, in order to be able to start a cutting, and a time of cutting.

In this arrangement, a protective gas, having a composition selected according to need with respect to the time of piercing and the time of cutting, is caused to flow, so that the amount of an expensive gas used can be reduced, thereby achieving a reduction in operating cost. That is, an expensive gas, such as hydrogen or argon, can be used as a protective gas for the purpose of obtaining a good cut surface quality. In piercing, however, only a through hole is formed in a workpiece, and there is substantially no influence upon the cut surface quality. Therefore, a low-priced protective gas can be used at the time of piercing, while only a small amount of an expensive gas is used at the time of cutting, thus achieving a reduction in operating cost.

According to a third aspect of the present invention, there is provided a plasma cutting apparatus having a piercing completion detection unit which detects an electric current between an electrode and a workpiece at the time of piercing, and which outputs a signal at a time representing the completion of the piercing, and a flow regulator which is provided in a protective gas circuit and which, in response to the piercing completion signal, switches the flow rate of a protective gas from a flow rate at the time of piercing to a flow rate at the time of cutting.

This arrangement ensures that the switching, from a protective gas flow rate suitable for use at the time of piercing to a protective gas flow rate suitable for use at the time of cutting, can be performed accurately and promptly, enabling the protection of the nozzle and good cutting as described above.

According to a fourth aspect of the present invention, there is provided a plasma cutting apparatus having a piercing completion detection unit which detects an electric current between an electrode and a workpiece at the time of piercing, and which outputs a signal at a time representing the completion of the piercing, and an on-off valve which is provided in a protective gas circuit and which, in response to the piercing completion signal, switches the composition of the protective gas from a composition at the time of piercing to a composition at the time of cutting. Further, a gas supply circuit having at least two on-off valves is provided in the protective gas circuit.

This arrangement ensures that the change-over, from the protective gas composition used at the time of piercing to the protective gas composition suitable for use at the time of cutting, can be made suitably and promptly to enable protection of the nozzle and good cutting as described above, thus achieving a reduction in operating cost.

BRIEF DESCRIPTION OF THE DRAWINGS

FIG. 1 is a diagram of a first embodiment of a plasma cutting apparatus;

FIG. 2 is a diagram showing an example of a time chart of the first embodiment;

FIG. 3 is a diagram of a second embodiment of a plasma cutting apparatus;

FIG. 4 is a diagram of a third embodiment of a plasma cutting apparatus; and

BEST MODE FOR CARRYING OUT THE INVENTION PREFERRED

Preferred embodiments of the present invention with respect to the plasma cutting methods and cutting apparatuses will be described below in detail with reference to the accompanying drawings.

(First Embodiment)

Figure 1:
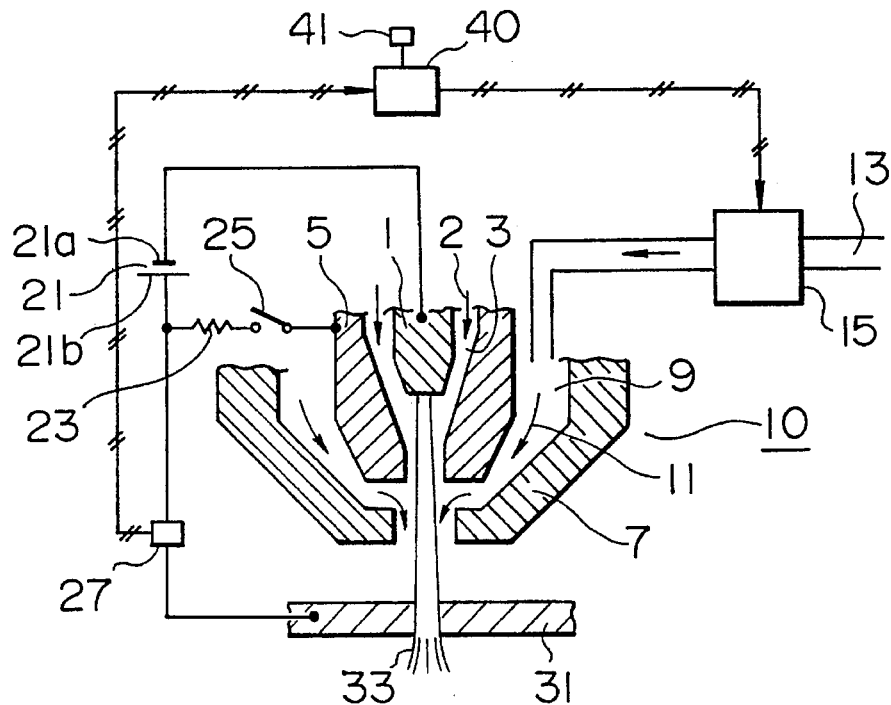
FIGS. 1 to 4 relate to the present invention.

A plasma cutting apparatus of this embodiment has, as shown in FIG. 1, an electrode 1 at a center of a torch 10, and a nozzle 5 disposed outside the electrode i as a cover, with a spacing for a plasma gas passage 3 for the plasma gas 2. A protective cap 7 is disposed outside the nozzle 5, and a protective gas passage 9 is provided between the nozzle 5 and the protective cap 7. A protective gas circuit, which has a flow regulator 15 and which supplies protective gas 11 from a supply source 13, is connected to the protective gas passage 9. The electrode 1 is connected to a cathode 21a of a power source 21. An anode 21b of the power source 21 is connected to the nozzle 5 through a resistor 23 and a switch 25. The anode 21*b* of the power source 21 is also connected to a workpiece 31 through a current detector 27. The current detector 27 is connected to a control unit 40, comprising a controller or the like. The control unit 40 is connected to the flow regulator 15. An input unit 41, for inputting the times at which the protective gas 11 is changed or any other quantity, is annexed to the control unit 40. A high-temperature plasma gas flow 33, made by arc discharge between the electrode 1 and the workpiece 31, is made thinner by the nozzle 5 and is jetted to the workpiece 31.

Figure 2:
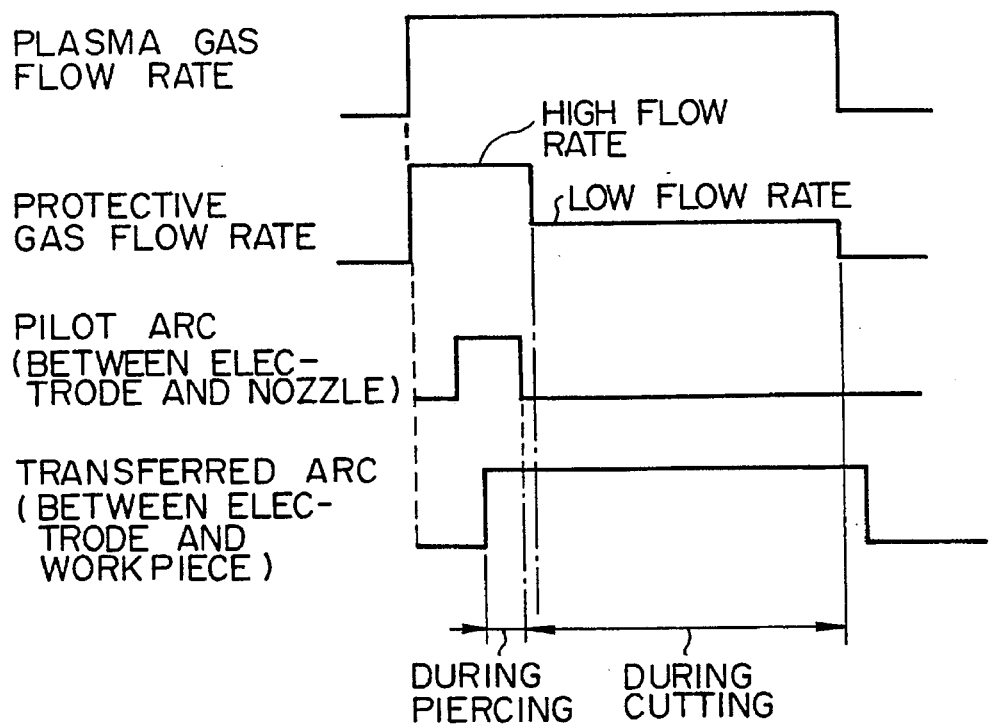

Plasma cutting by this arrangement will be described with reference to FIG. 1 and FIG. 2, in which an example of a time chart is shown. First, a switch (not shown), of the input unit 41, annexed to the control unit 40, is actuated to start the operation of the plasma cutting apparatus. Plasma gas 2 and protective gas 11 are thereby caused to start flowing. At this time, the flow regulator 15 is set, by a command from the control unit 40, to such a position that the protective gas 11 flows at a high rate. Next, the switch 25 is operated to generate a pilot arc between the electrode 1 and the nozzle 5. Subsequently, the arc connects the electrode 1, the nozzle 5 and the workpiece 31, thereby forming a transferred arc. At this time, the electric current flowing between the electrode 1 and the workpiece 31 is detected by the current detector 27, indicating a start of piercing, and the switch 25 is opened after the detection. A predetermined time lapse after the start of piercing is detected by the control unit 40, and a piercing completion signal is outputted from the control unit 40 to the flow regulator 15 to change the position of the flow regulator 15 to that for a low flow rate. When the flow rate of the flow regulator 15 is switched to the low flow rate, the torch 10 is moved to start cutting the workpiece 31. In this embodiment, a piercing completion detection unit, for the detection of an electric current at the start of a piercing and for outputting a signal at a time representing the completion of the piercing, is constituted by the current detector 27 and the control unit 40 (including the input unit 41).

The piercing completion signal is set by a timer or the like in the control unit 40 so as to be outputted zero to two seconds after the detection of the piercing start signal. However, a time selected according to need with respect to the thickness and the material of the workpiece 31 can also be inputted through the input unit 41. Also, the current detector 27 for detecting the start of a piercing can have a timer or the like which starts after the detection of the start of the piercing, to form a piercing completion detection unit which transmits a piercing completion signal after a predetermined time lapse. In this case, the piercing completion signal is outputted from the piercing completion detection unit to the control unit 40 and is outputted from the control unit 40 to the flow regulator 15 to switch the flow regulator 15 to the position for the low flow rate. Also, the flow rate of protective gas 11 can be switched to the low flow rate after the change to cutting. Further, a plurality of flow regulators 15 can be arranged in parallel to use various kinds of protective gases.

As described above, a large amount of dross, in the form of large particles having a large momentum and blown upwardly from the workpiece 31 before piercing, particularly before the formation of a through hole, is blown away, because the protective gas flow rate is set to a high flow rate at the time of piercing. The nozzle 5 is thereby reliably protected from dross. On the other hand, at the time of cutting, a greater portion of the dross is scattered to the reverse side of the workpiece 31, the amount of the dross moving toward the torch 10 is small, and the dross is in the form of fine particles. It is therefore possible to protect the nozzle 5 with a protective gas 11 at a low flow rate. Thus, the nozzle 5 is protected from the dross, and the plasma gas flow 33 is not affected by cooling or disturbance since the protective gas flow rate is low, so that good quality cutting is possible.

(Second Embodiment)

Figure 3:
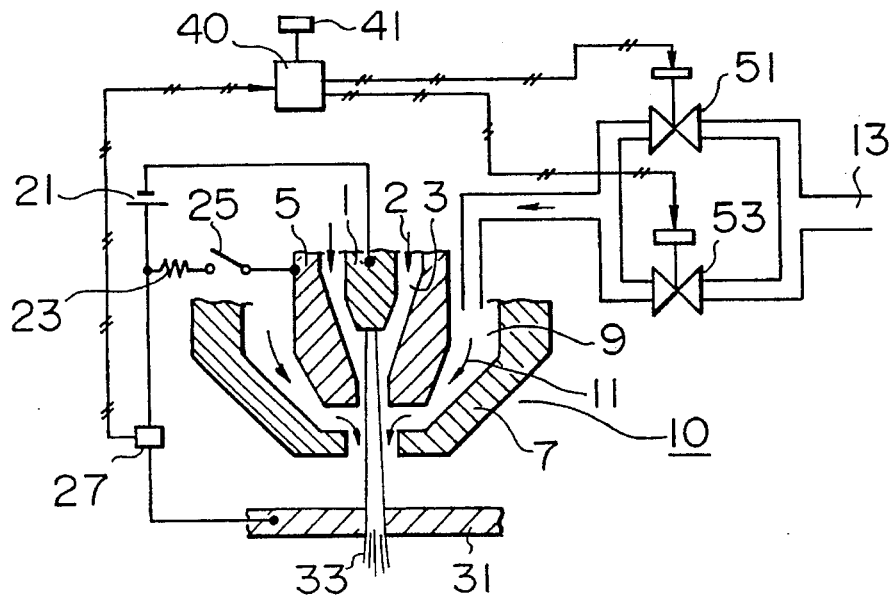

This embodiment will be described with reference to FIG. 3. The same parts and functional units as those of the first embodiment in FIG. 1 are indicated by the same reference characters, and the description for them will not be repeated. As shown in FIG. 3, a low flow rate on-off valve 51, for a low flow rate at the time of cutting, and a high flow rate on-off valve 53, for a high flow rate at the time of piercing, are provided in parallel with each other. The low flow rate on-off valve 51 and the high flow rate on-off valve 53 are connected to a supply source 13 for supplying protective gas 11 to form a protective gas circuit, which is connected to a protective gas passage 9 and a control unit 40.

In this arrangement, the protective gas flow rate is switched as described below. First, the low flow rate on-off valve 51 and the high flow rate on-off valve 53 are previously set to a low flow rate for the time of cutting and a high flow rate for the time of piercing, respectively. The operation, after a switch input to the plasma cutting apparatus, is performed in accordance with a command of the control unit 40. At the time of piercing, the high flow rate on-off valve 53 is opened to cause protective gas 11 to flow at the high flow rate. After the completion of piercing, the high flow rate on-off valve 53 is closed in response to the piercing completion signal, and the low flow rate on-off valve 51 is opened to cause the protective gas 11 to flow at the low flow rate during the time of cutting, thus switching the flow rate. The arrangement can alternatively be such that the low flow rate on-off valve 51 is set to a predetermined low flow rate, while the high flow rate on-off valve 53 is set so as to obtain a predetermined high flow rate when combined with the flow rate of the low flow rate on-off valve 51, with both the low flow rate on-off valve 51 and the high flow rate on-off valve 53 being opened at the time of piercing, while, at the time of cutting, the high flow rate on-off valve 53 is closed and the low flow rate on-off valve 51 is maintained in the open state. Switching can be performed speedily by the above described control of the on-of valves.

(Third Embodiment)

Figure 4:
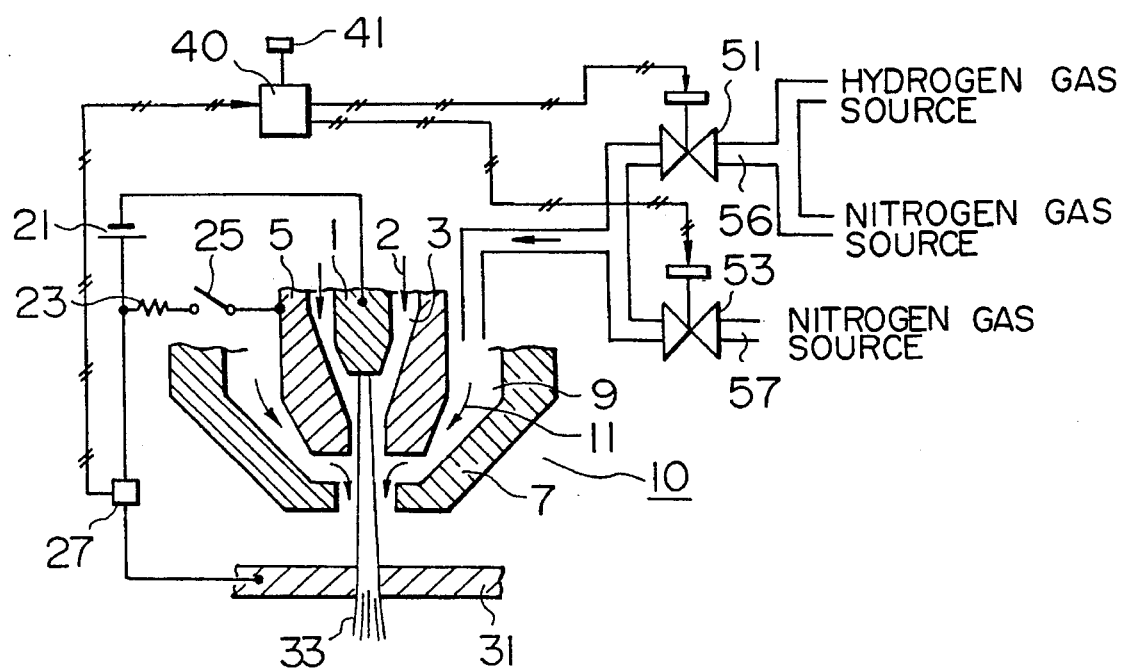
Figure 5:
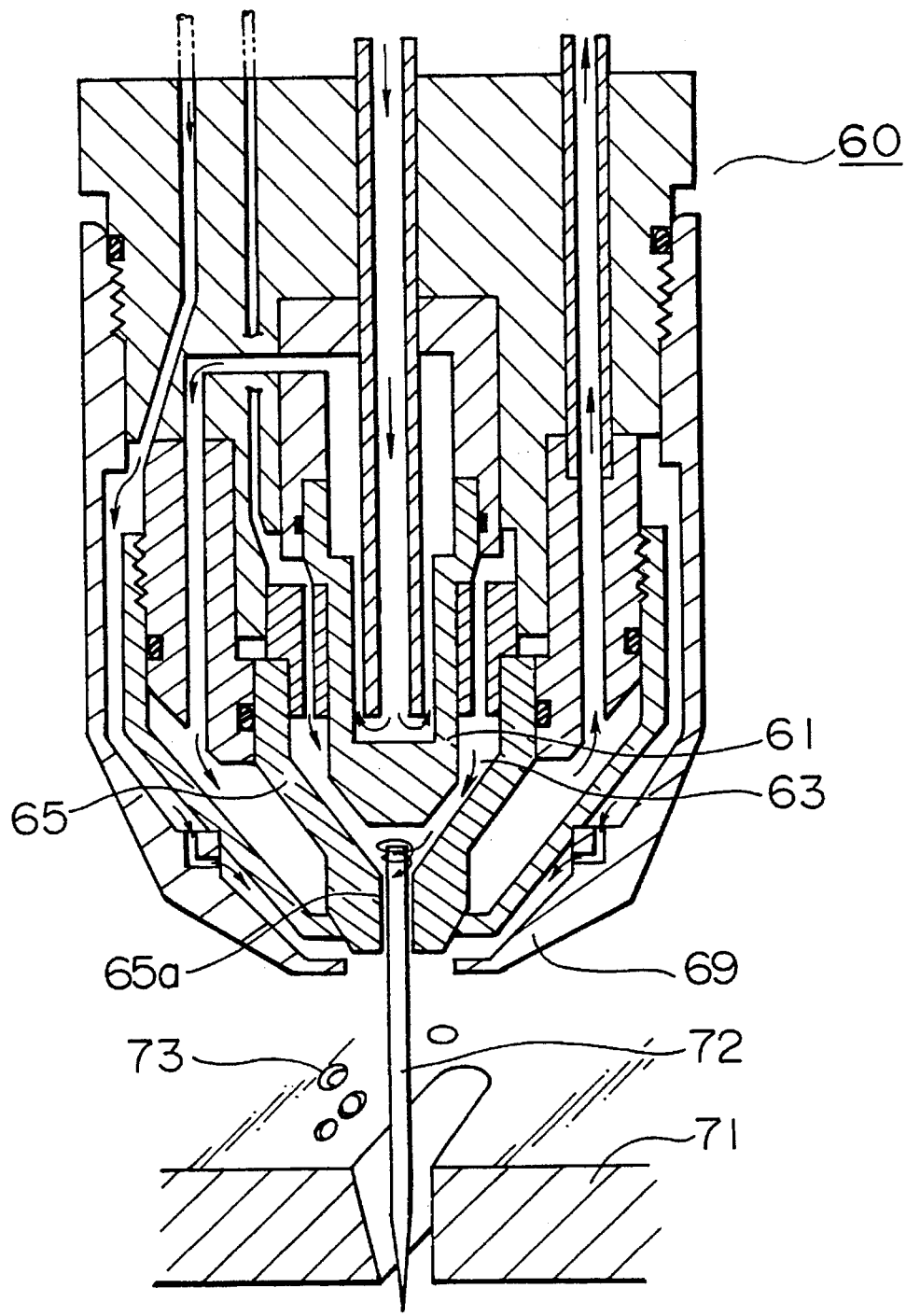
FIG. 5 is a cross-sectional view of a main portion of a plasma cutting apparatus of the conventional art.

FIG. 4 shows this embodiment of a plasma cutting apparatus. The same parts and functional units as those of FIG. 1 or FIG. 3 are indicated by the same reference characters, and the description for them will not be repeated. A protective gas circuit has a low flow rate on-off valve 51 for a low flow rate at the time of cutting, a high flow rate on-off valve 53 for a high flow rate at the time of piercing, a supply source 56 for mixing expensive hydrogen and nitrogen in accordance with a predetermined composition, and a supply source 57 for supplying low priced nitrogen gas. The low flow rate on-off valve 51 and the high flow rate on-off valve 53 are connected in parallel with each other to a protective gas passage 9. The low flow rate on-off valve 51 is connected to the supply source 56, while the high flow rate on-off valve 53 is connected to the supply source 57.

In this arrangement, the protective gas flow rate and the gas composition are switched as described below. First, at the time of piercing, both the low flow rate on-off valve 51 and the high flow rate on-off valve 53 are opened to cause protective gas 11, mainly constituted by nitrogen gas, to flow at the combined high flow rate. Next, at the time of cutting, the high flow rate on-off valve 53 is closed in response to a piercing completion signal, and the low flow rate on-off valve 51 is maintained opened to cause the hydrogen-nitrogen gas mixture to flow at the low flow rate while cutting is performed. It is thereby ensured that the nozzle 5 is effectively protected from any dross blown upwardly, while high quality cutting can be performed so that the cut surface of the workpiece 31 has metallic gloss by the effect of the hydrogen gas. Also, the amount of the expensive hydrogen gas used is minimized by adjusting the flow rate and the composition of the protective gas at the time of piercing and the time of cutting, thereby enabling cutting at a small operating cost. The protective gas is not limited to hydrogen and nitrogen, and any other various gases, i.e., inert gases such as argon and helium, air and the like can be used. For example, air can be used as the high flow rate protective gas at the time of piercing, and nitrogen or an inert gas can be used as the protective gas during cutting. By the use of air, the operating cost is further reduced. The number of on-off valves (low flow rate on-off valve 51 and high flow rate on-off valve 53) in the protective gas circuit is not limited to two, and the on-off valve operation can be performed in accordance with the same conception to achieve the same effect even if the number of on-off valves is three or more. Further, the same effect can also be obtained even if the protective gas circuit has a flow regulator as well as an on-off valve.

INDUSTRIAL APPLICABILITY

The present invention is useful as a plasma cutting method and a cutting apparatus in which the flow rate of protective gas is suitably switched between suitable flow rates at the time of piercing and at the time of cutting to protect the nozzle favorably from dross and the like at the time of piercing and cutting so that a high quality cut surface is formed, and in which suitable protective gas compositions can be set with respect to the time of piercing and the time of cutting such that the operating cost is be reduced.

What is claimed is:

1. A method for piercing and cutting a workpiece with a plasma torch, said plasma torch having an electrode, a nozzle having an orifice, a plasma gas passage, a protective cap having an opening in alignment with said orifice, and a protective gas passageway, said method comprising the steps of:

causing a plasma gas to flow through said plasma gas passage;

generating a plasma arc between said electrode and said workpiece through said plasma gas to form a plasma gas flow;

jetting said plasma gas flow from said nozzle orifice through said opening toward said workpiece to pierce a hole in said workpiece while causing a first protective gas to flow through said protective gas passageway and said opening so that said first protective gas surrounds said plasma gas flow so as to serve as a shield for said plasma gas flow and as protection for said nozzle against dross during the piercing of said hole in said workpiece; and then jetting said plasma gas flow from said nozzle orifice through said opening toward said workpiece to form a cut in said workpiece adjacent to said hole while causing a second protective gas to flow through said protective gas passageway and said opening so that said second protective gas surrounds said plasma gas flow so as to serve as a shield for said plasma gas flow during the formation of said cut in said workpiece;

wherein said second protective gas has a composition which is different from the composition of said first protective gas so that a cut surface quality of the resulting cut in said workpiece is improved in comparison to a cut surface quality that would be achieved with use of said first protective gas instead of said second protective gas during the formation of said cut in said workpiece.

2. A method in accordance with claim 1 wherein said first protective gas is provided at a first flow rate and said second protective gas is provided at a second flow rate, and wherein said first flow rate is substantially higher than said second flow rate.

3. A method in accordance with claim 2, wherein said second protective gas is a more expensive material than said first protective gas.

4. A method in accordance with claim 2, wherein said first protective gas comprises nitrogen and said second protective gas comprises hydrogen and nitrogen.

5. A method in accordance with claim 2, wherein said first protective gas comprises air and said second protective gas comprises nitrogen.

6. A method in accordance with claim 2, wherein said first protective gas comprises air and said second protective gas comprises an inert gas.

7. A method in accordance with claim 1, wherein said first protective gas comprises nitrogen and said second protective gas comprises hydrogen and nitrogen.

8. A method in accordance with claim 1, wherein said first protective gas comprises air and said second protective gas comprises nitrogen.

9. A method in accordance with claim 1, wherein said first protective gas comprises air and said second protective gas comprises an inert gas.

10. A method in accordance with claim 1, wherein, after the piercing of said hole in the workpiece is completed, the flow of said first protective gas is terminated and the flow of said second protective gas is initiated.

11. A method in accordance with claim 10, wherein said first protective gas comprises nitrogen and said second protective gas comprises hydrogen and nitrogen.

12. A method in accordance with claim 1, wherein the flow of said first protective gas comprises a combination of a first gas flow and a second gas flow, wherein said second protective gas comprises only said second gas flow, and wherein said first gas flow is terminated after the piercing of said hole in the workpiece is completed.

13. A method in accordance with claim 12, wherein said first gas flow comprises nitrogen and said second gas flow comprises hydrogen and nitrogen.

14. A method in accordance with claim 1, further comprising providing a piercing completion signal at a time representing the completion of the piercing of the hole, and responsive to said piercing completion signal terminating the flow of said first protective gas and initiating the flow of said second protective gas.

15. A method in accordance with claim 14, wherein the step of providing a piercing completion signal comprises detecting an electric current between said electrode and said workpiece at the start of the piercing of the hole and producing said piercing completion signal at a predetermined time lapse after the detection of said electric current.

* * * * *